United States Patent
Hill et al.

(10) Patent No.: US 9,996,106 B2
(45) Date of Patent: Jun. 12, 2018

(54) DUAL DISPLAY PANEL MOUNT ACCESSORY

(71) Applicant: Lenovo (Singapore) Pte. Ltd., Singapore (SG)

(72) Inventors: David Wayne Hill, Cary, NC (US); Cuong Huy Truong, Cary, NC (US); Ali Kathryn Ent, Raleigh, NC (US); Cyan Godfrey, Chapel Hill, NC (US); Matthew Ian Tucker, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 78 days.

(21) Appl. No.: 15/019,705

(22) Filed: Feb. 9, 2016

(65) Prior Publication Data

US 2017/0227984 A1 Aug. 10, 2017

(51) Int. Cl.
*G06F 1/16* (2006.01)
*G06F 1/18* (2006.01)

(52) U.S. Cl.
CPC ............ *G06F 1/1601* (2013.01); *G06F 1/189* (2013.01)

(58) Field of Classification Search
CPC ................................ G06F 1/1601; G06F 1/189
See application file for complete search history.

(56) References Cited

U.S. PATENT DOCUMENTS

| | | | | |
|---|---|---|---|---|
| 6,702,604 B1 * | 3/2004 | Moscovitch | ........ | B60R 11/0235 248/121 |
| 7,652,876 B2 * | 1/2010 | Moscovitch | ........... | F16M 11/04 345/1.3 |
| 8,534,615 B2 * | 9/2013 | Huang | ................. | F16M 11/045 248/125.1 |
| 9,529,464 B2 * | 12/2016 | Sitbon | .................... | F16M 11/08 |
| 2007/0097617 A1 * | 5/2007 | Searby | ................. | F16M 11/041 361/679.4 |
| 2007/0097618 A1 * | 5/2007 | Searby | ................. | F16M 11/041 361/679.4 |
| 2008/0117578 A1 * | 5/2008 | Moscovitch | ......... | F16M 11/105 361/679.04 |
| 2008/0225471 A1 * | 9/2008 | Takizawa | .............. | G06F 1/1601 361/824 |
| 2008/0232049 A1 * | 9/2008 | Takizawa | .............. | G06F 1/1601 361/679.01 |
| 2009/0079665 A1 * | 3/2009 | Moscovitch | ........... | F16M 11/10 345/1.3 |
| 2009/0167634 A1 * | 7/2009 | Han | ...................... | G06F 1/1601 345/1.3 |
| 2015/0192956 A1 * | 7/2015 | Whorton | .............. | C07D 493/04 361/679.43 |
| 2016/0062399 A1 * | 3/2016 | Hsu | ........................ | G06F 1/1601 361/679.21 |
| 2016/0062400 A1 * | 3/2016 | Hsu | ........................ | G06F 1/1632 361/679.21 |
| 2017/0138530 A1 * | 5/2017 | Neukam | ................. | F16M 11/10 |

* cited by examiner

*Primary Examiner* — Hoa C Nguyen
*Assistant Examiner* — Keith Depew
(74) *Attorney, Agent, or Firm* — Ference & Associates LLC

(57) ABSTRACT

One embodiment provides a mount accessory, including: a central part having a centrally located hinge; two long edges that are hingedly attached to the centrally located hinge and extend from the central part; each of the two long edges including a ledge having a connector therein; and a centrally located connector disposed in the central part. Other aspects are described and claimed.

14 Claims, 7 Drawing Sheets

DUAL DISPLAY PANEL MOUNT ACCESSORY

BACKGROUND

Information handling devices (e.g., workstations, personal computers, etc.) may allow a user to employ two or more monitors, e.g., in an extended desktop use case. Conventionally, when multiple monitors are utilized, separate monitors are provided, with each having its own stand. Each monitor typically is hard wired to the main system, e.g., providing video data and power wires that connect the monitor or display to the tower or main system. In other cases, a more unitary main system with integral display may be extended by linking additional monitors or displays to the main system, again typically by wire and using an additional stand for the additional display. Furthermore, there are single stands that can hold two separate monitors that are in turn wired to a system.

As may be appreciated, dual monitor set ups take up a lot of desk space. Cabling for multiple monitors can be messy and takes up additional space on the user's desk or work area. Moreover, often screen sizes and other physical dimensions (bezels, etc.) are different.

BRIEF SUMMARY

In summary, one aspect provides a mount accessory, comprising: a central part comprising a centrally located hinge; two long edges that are hingedly attached to the centrally located hinge and extend from the central part; each of the two long edges comprising a ledge having a connector therein; and a centrally located connector disposed in the central part.

Another aspect provides a system, comprising: a dock including electronics and a connector to carry video signals; and a mount accessory, including: a central part comprising a centrally located hinge; two long edges that are hingedly attached to the centrally located hinge and extend from the central part; each of the two long edges comprising a ledge having a connector therein; and a centrally located connector disposed in the central part.

A further aspect provides a system, comprising: two display panels; a dock including electronics and a connector to carry video signals between the dock and the two display panels; and a mount accessory, including: a central part comprising a centrally located hinge; two long edges that are hingedly attached to the centrally located hinge and extend from the central part; each of the two long edges comprising a ledge having a connector therein that connects to a respective one of the two display panels; and a centrally located connector disposed in the central part that connects to the connector of the dock.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
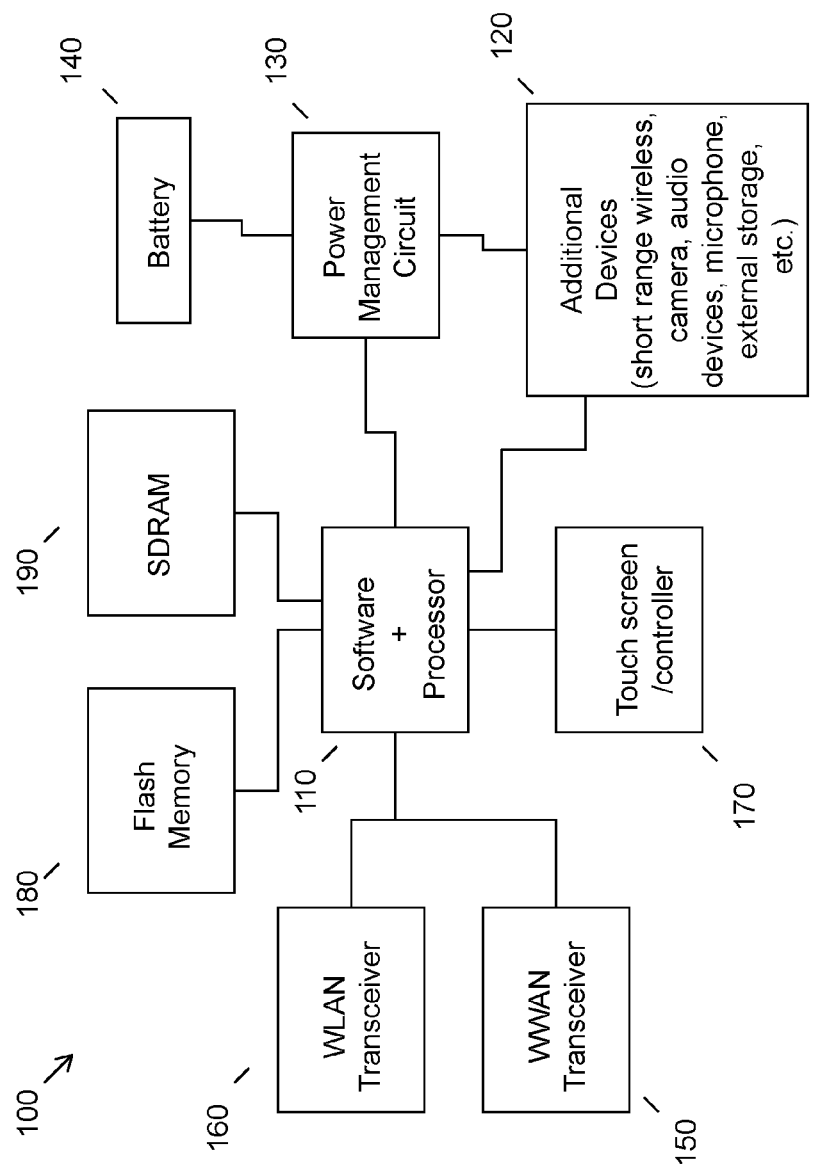
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides a mount accessory that accommodates multiple monitors or display panels. In an embodiment, the mount accessory includes a ledge or base area that a removable display panel (or panels) attaches to. In an embodiment, the removable display panel (or panels) includes a female port that mates with a male connector provided in the ledge or base area.

An embodiment provides a mount accessory that includes a centrally located hinge. The ledge or base area of the mount accessory may be bifurcated into two ledges or base areas, e.g., one ledge to support each of the two display panels. Each of the two ledges or base areas may include a male connector for connecting to the female port provided in a display panel.

In an embodiment, the bifurcated mount accessory may include ledges or base areas that move about the centrally located hinge to pivot away from and towards a dock or away from and towards a user sitting in front of the displays.

In an embodiment, a mount accessory connects physically and electrically to a single dock or like module. The dock may comprise a dock connected to or integrated with a main computer system. The mount accessory may include a female port that connects to a male connector provided by the dock, and the mount accessory may include two or more male connectors, e.g., on the ledges or base areas, for insertion to female ports on the display panels. Thus, no cables are required for connecting the display panels to the main system (e.g., workstation or desktop computer).

The mount accessory may include a ledge or base area in the form of two ledges (like easels), side-by-side, with male connectors to operatively couple two display panels (like canvases). The two ledges can be adjusted on a central or main hinge to desirable viewing angles (like an open book that may be opened to varying degree). Connectors of the ledges may be moveable, e.g., sideways along the lateral or long axes of the ledges, to align with the male connectors with female connectors or ports of different sized display panels.

The lateral alignment or height of the two ledges may be fixed at the same level so that dual monitors of the same size are automatically aligned in height, creating a clean look.

When the dual monitor mount accessory is connected to a single dock or stand, the footprint on the desk is minimal when compared to two monitors on two stands side-by-side on a desk.

The illustrated example embodiments will be best understood by reference to the figures. The following description is intended only by way of example, and simply illustrates certain example embodiments.

While various other circuits, circuitry or components may be utilized in information handling devices, with regard to system on chip circuitry such as found in smart phone and/or tablet circuitry 100, an example illustrated in FIG. 1 includes a design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
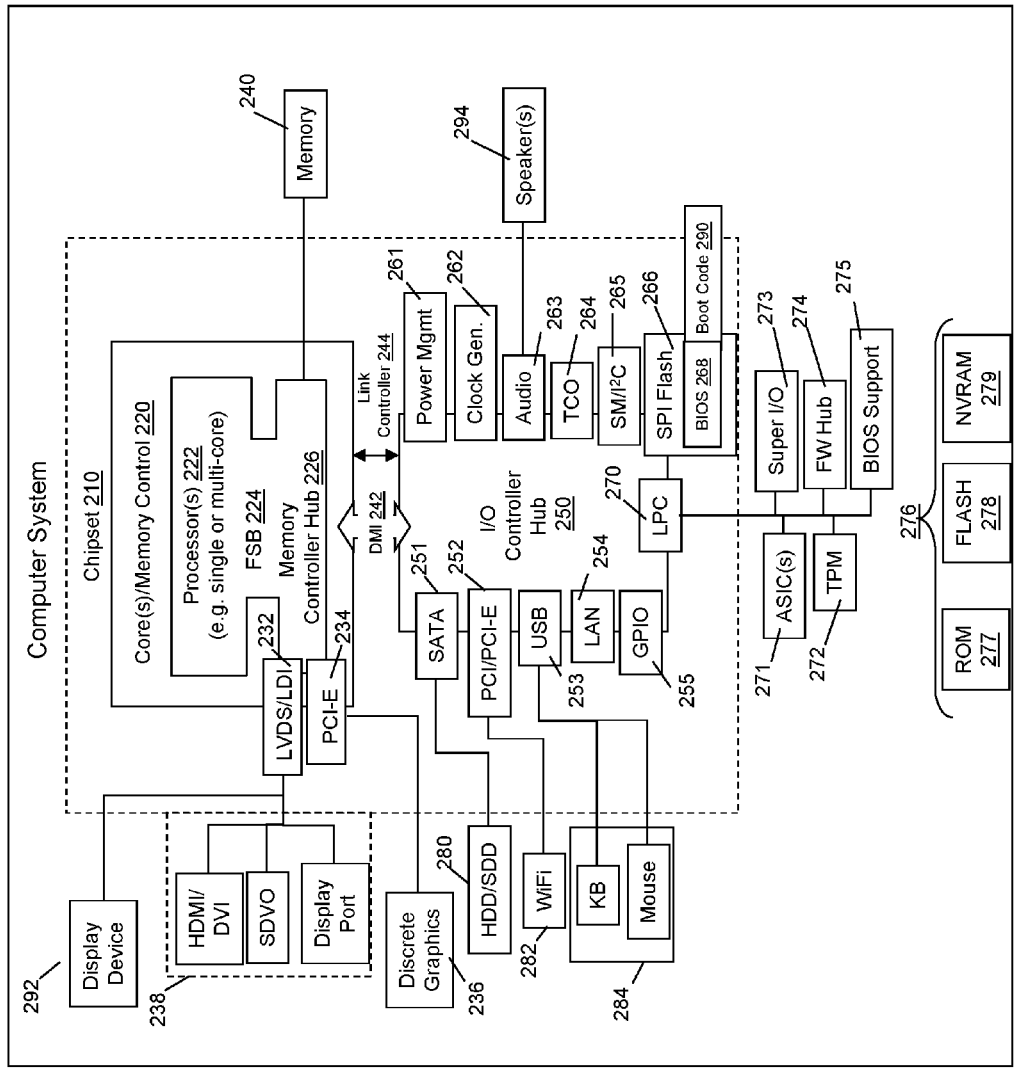
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, electromyography devices, electroencephalography devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices generally. For example, the circuitry outlined in FIG. 2 may make up the circuitry included in a dock or a main computer system to which the dock connects. Similarly, the circuitry outlined in FIG. 1 may make up the circuitry of a computer system contained in the dock, or may be used in a monitor or display panel, i.e., connectable to a mount accessory as further described herein. More or fewer components than outlined in FIG. 1 and/or FIG. 2 may be utilized. For example, the circuitry in FIG. 1 may be reduced such that the components included in a display panel form a reduced system, e.g., omission of the battery and other components, but inclusion of a circuit board and a power and data interface for connecting to a dock. Such an arrangement or configuration permits the display panel to be very light weight, with the remaining circuitry and components necessary for data handling (e.g., audio and video data display, input processing, etc.) remaining in the dock and/or main system to which the dock connects. However, it should be noted that the display panels referred to herein may contain some or all of the circuitry outlined in FIG. 1 or FIG. 2, or a combination thereof, such that the display panels operate as systems in their own right, e.g., as a mobile tablet computing device.

In an embodiment, illustrated by way of non-limiting example in FIG. 3(A-B), a system 300 includes a stand 301. The stand in turn may include a stabilizing base element 302 that supports the overall system 300. By way of example, the stabilizing base element 302 may be formed of a material such as metal or may be a composite of several materials in order to provide a mass that lowers the center of gravity of the stand 301. This reduces the chance of system 300 instability when a fully inclusive system 300 (i.e., having mount accessory 304 and display panel(s) 330, 331) is formed.

The stand 301 may connect to or be integrated with a dock 303 at an upper part of the stand 301. The dock 303 may be operatively coupled to the stabilizing base element 302, e.g., if one or more wires (not shown) extend from the stabilizing base element 302 to connect power and/or data for the dock, e.g., a wired connection to a main computer system (not shown).

Figure 3B:
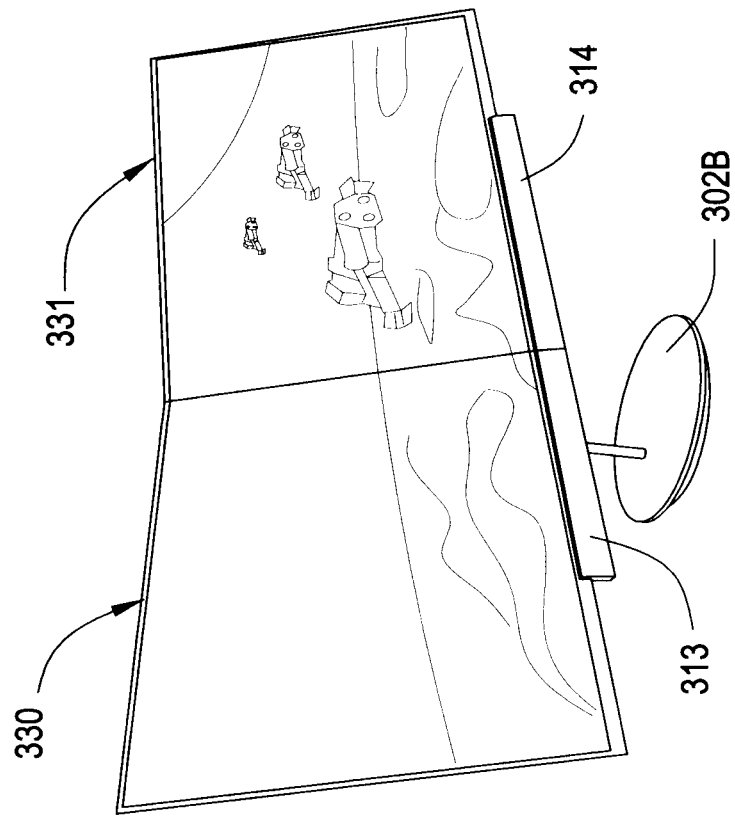
FIG. 3(A-B) illustrates an example system including a stand, dock, mount accessory and display panels.
Figure 3A:
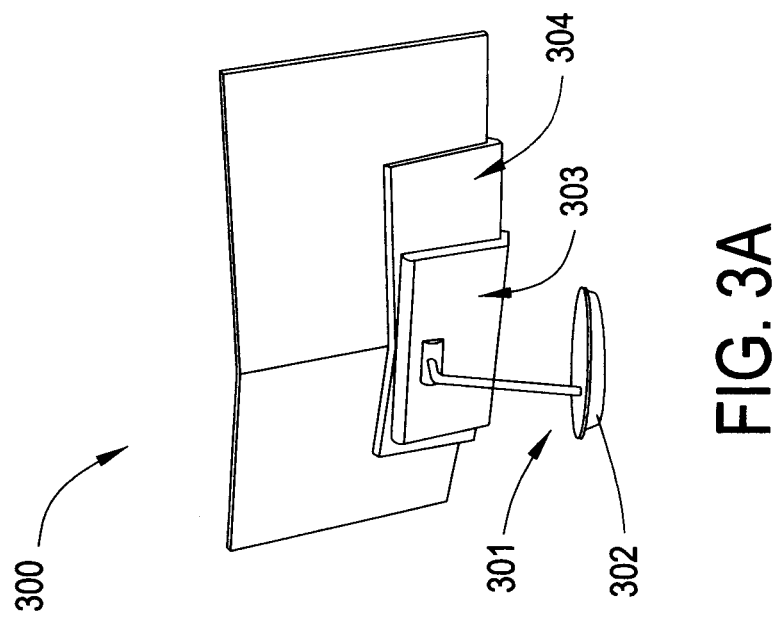

As illustrated in FIG. 3A, the dock 303 and the display panels (330, 331 in FIG. 3B) connect via a mount accessory 304. The mount accessory 304 includes power and data connectors for both the dock 303 and the display panels 330, 331, as further described herein. As illustrated in FIG. 3B, the mount accessory 304 supports display panels 330, 331 by inclusion of ledges 313, 314, similar to an easel supporting canvases. The long edges may include audio speakers for output of audio data, alone or in connection with display of video data on the display panel(s).

Figure 4:
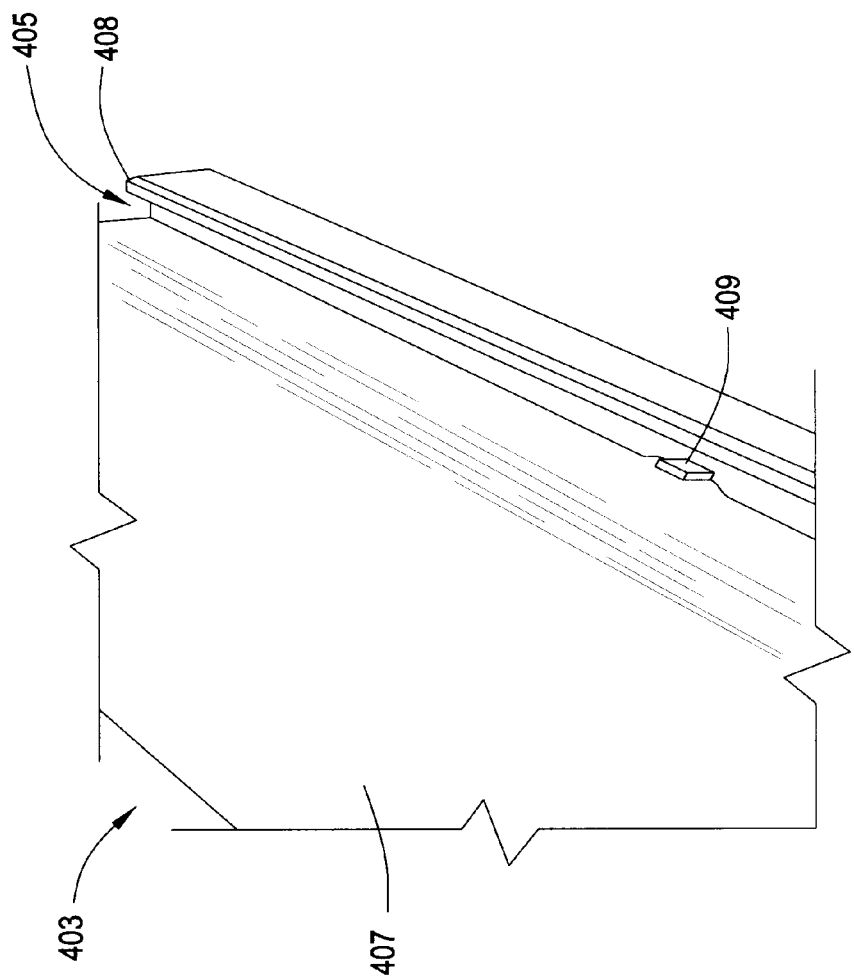
FIG. 4 illustrates an example dock.

Referring to FIG. 4, which illustrates a perspective view of the front of the dock 403, the dock 403 may include a male connector 409 to which the mount accessory (not illustrated in FIG. 4) attaches. The male connector 409 may be placed or disposed in a ledge 405 of the dock 403, as illustrated. The spacing between an outer lip 406 of the ledge 405 and a front wall or face 407 of the dock 403 may be sized appropriately to accommodate insertion of the mounting accessory, a display panel, or both. The male connector of the dock 409 may include power pins and data pins to communicate power to and data to and from the display panel(s), either connected directly to the dock 403 via male connector 409, or as connected to the mounting accessory and thus to the dock 403, as further described herein.

Figure 5:
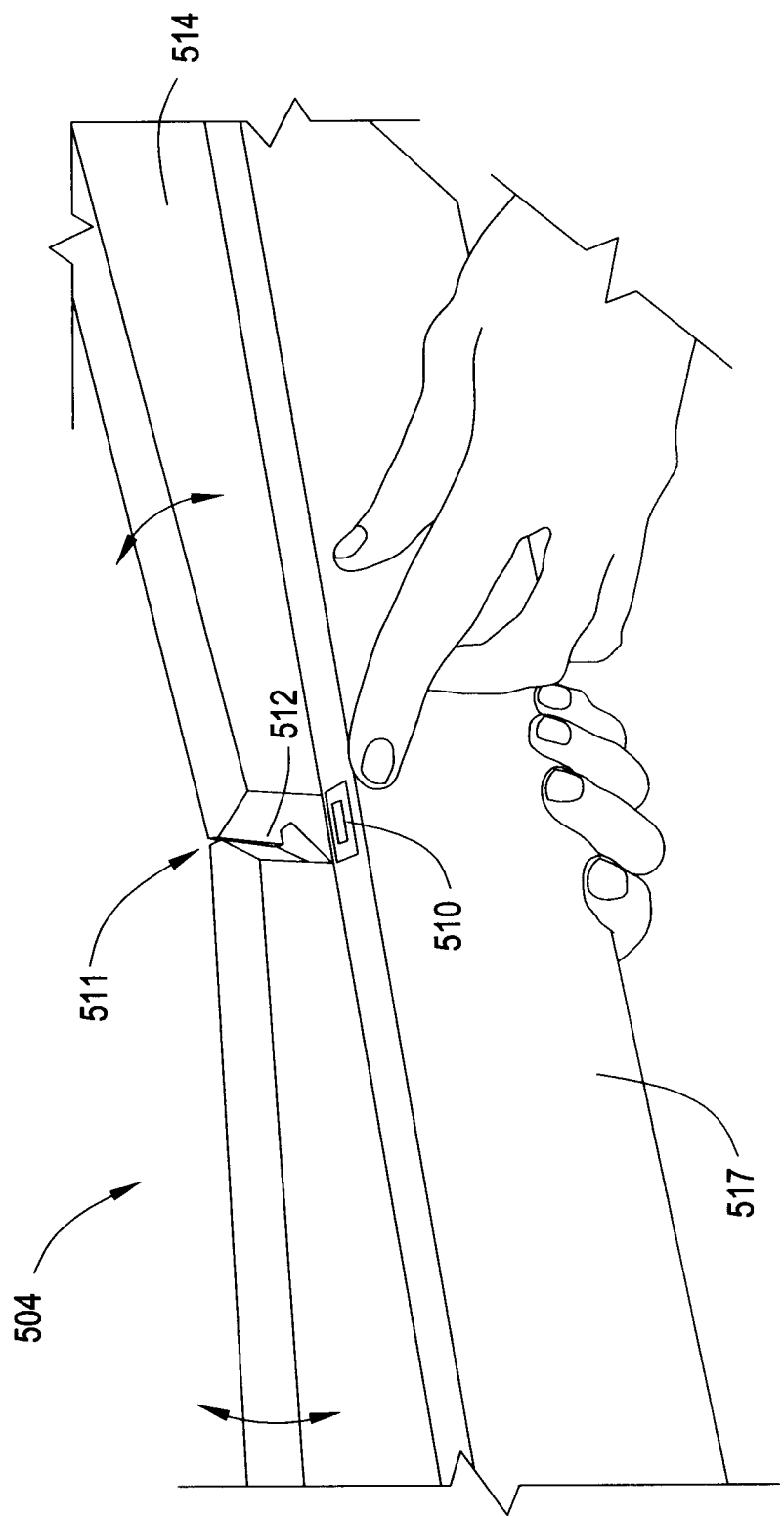
FIG. 5 illustrates an underside of an example mount accessory.

As shown in FIG. 5, the underside of a mount accessory 504 includes a centrally located female port 510 disposed in a central area 511. This female connector or port 510 attaches to the male connector of the dock 409. Referring to FIG. 4, as has been described herein, a display panel having a similar female connector or port, and similarly sized bezel or casing, may be directly inserted into the ledge 405 of the dock and connected to the male connector 409 of the dock. A central area 511 of the mount accessory 504 comprises a centrally located hinge 512, partially visible from in the view of FIG. 5.

Two long edges 513, 514 are hingedly attached to the centrally located hinge 512 and extend from the central area 511. Each of the two long edges 513, 514 move about the centrally located hinge 512 such that they may be repositioned out (fore) and back (aft) with respect to the back plate 517 of the mount accessory 504 and thus with the same movement with respect to the front wall 407 of the dock.

Figure 6:
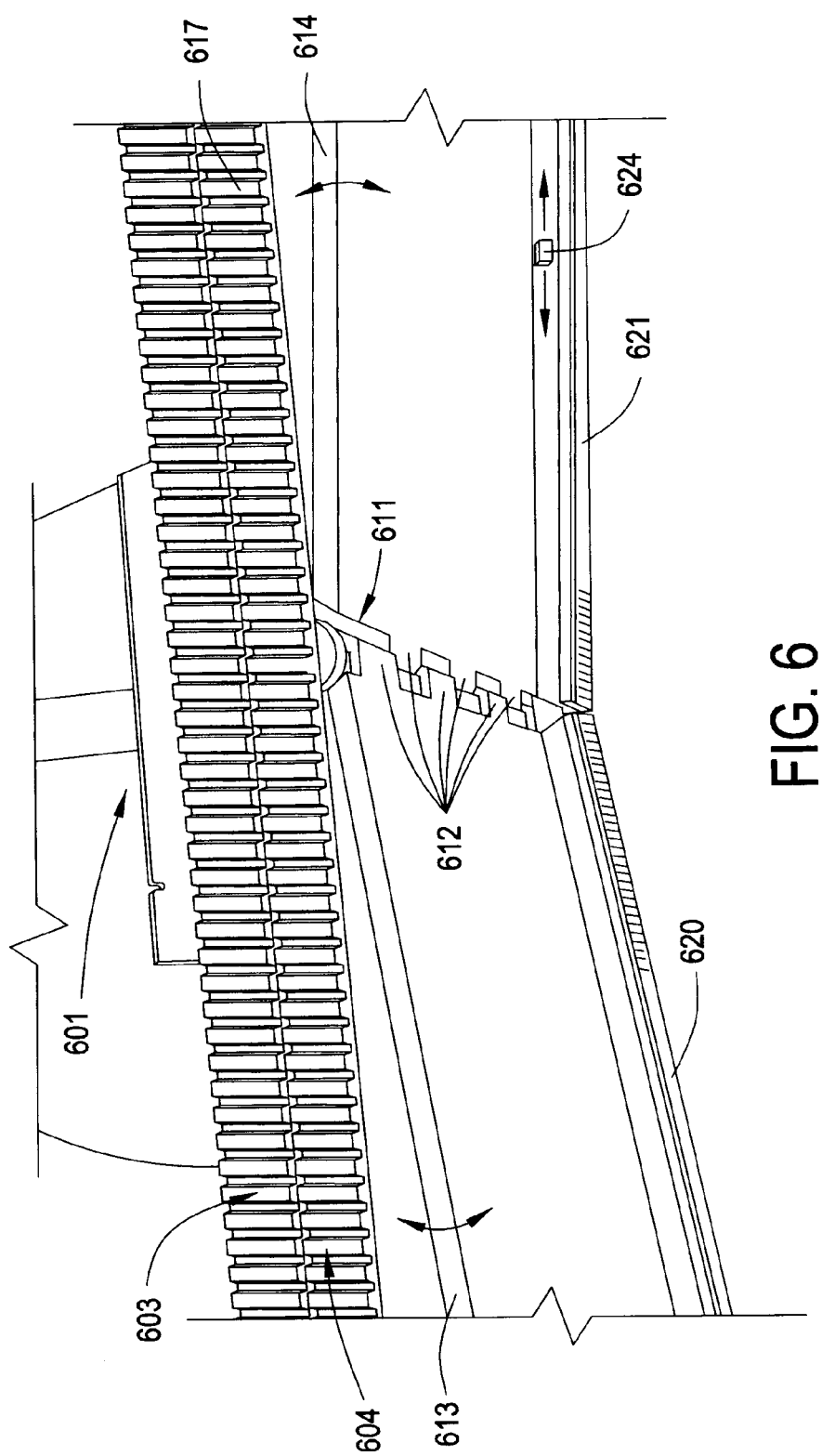
FIG. 6 illustrates an example top view of a mount accessory situated in a dock.

In FIG. 6 a top view illustrates the mount accessory 604 seated into the dock 603. The arm of the stand 601 can be seen attached to a rear surface of the dock 603.

The front of the mount accessory 604 includes a back plate 617 that abuts the front wall or face of the dock 604. The two long edges 613, 614 are hingedly connected via central hinge 612 in central area 611. The two long edges 613, 614 may pivot about the central hinge 612 to more fore and aft, as illustrated by the arrows of FIG. 6.

The two long edges 613, 614 further comprise ledges 620, 621. Each of the two ledges comprises a male connector, one of which is illustrated at 624, disposed therein. The male connector 624 of ledge 621 may be the same as male connector 409 of the dock 403. The male connector 624 of the ledge 621 may move laterally or along a long axis of the long edge 614, as indicated by the arrows in FIG. 6 surrounding male connector 624.

Figure 7:
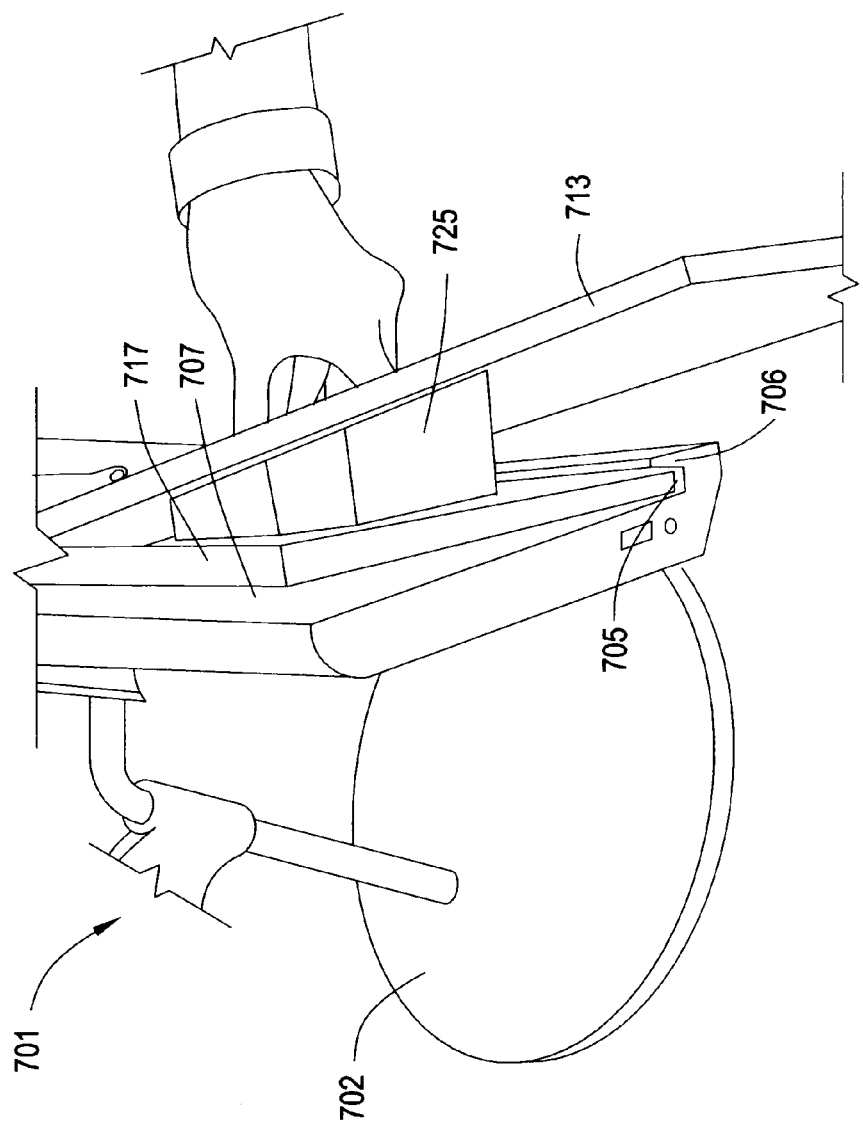
FIG. 7 illustrates a side view of a mount accessory being placed in a dock.

FIG. 7 offers a side view of the system in which the stabilizing base 702 has an arm extending there-from to form a stand 701 to support the dock, mount accessory, and ultimately the display panel(s) (not illustrated in FIG. 7). As shown, the front wall or face 707 of the dock provides a surface that will abut the back plate 717 of the mount accessory. The mount accessory is seated into the ledge 705 of the dock, connecting with a male connector of the dock via female connector or port at the bottom of the mount accessory (refer to FIG. 4 and FIG. 5). The front lip 706 of the dock secures the back plate 717 of the mount accessory therein. The mount accessory may include a wedge 725 or other shaped element to bias the amount that each long edge, e.g., long edge 713 in this example, rotates about the central hinge.

Thus, an embodiment provides a mount accessory that can accommodate one or more display panels. The mount accessory permits mounting on a dock, and in turn mounting of display panel(s) to the mount accessory such that the display panel(s) seated thereon are operatively connected to the dock, which may be an inclusive system, or may provide further connection to another system (e.g., tower type desktop computer).

As used herein, the singular "a" and "an" may be construed as including the plural "one or more" unless clearly indicated otherwise. Moreover, the connectors described herein may be any type. It is specifically noted that the use of "male" or "female" connector in the description and claims is to be interpreted broadly, i.e., a "male" connector may be replaced by a "female" connector, and vice versa, so long as an operative, physical connection is achieved.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A mount accessory, comprising:
   a back plate;
   a central part comprising a centrally located hinge;
   two long edges that are hingedly attached to the centrally located hinge and extend from the central part, wherein the centrally located hinge allows the two long edges to pivot with respect to each other and the back plate about the centrally located hinge;
   each of the two long edges comprising a ledge having a connector therein, wherein the connector of each ledge is moveable about an axis coincident with a long edge and wherein each connector is movable by sliding; and
   a centrally located connector disposed in the central part back plate.

2. The mount accessory of claim 1, wherein the centrally located connector accepts a connector of a dock.

3. The mount accessory of claim 2, wherein the connector of each ledge is of the same type as the connector of the dock.

4. The mount accessory of claim 1, wherein the connector of each ledge comprises power pins and data pins.

5. The mount accessory of claim 1, said centrally located hinge permitting the at least one of the two long edges to rotate in fore and aft degrees of freedom.

6. The mount accessory of claim 1, said centrally located hinge permitting each of the two long edges to rotate in fore and aft degrees of freedom about said centrally located hinge.

7. A system, comprising:
   a dock including electronics and a connector to carry video signals; and
   a mount accessory, including:
      a back plate;
      a central part comprising a centrally located hinge;
      two long edges that are hingedly attached to the centrally located hinge and extend from the central part, wherein the centrally located hinge allows the two long edges to pivot with respect to each other and the back plate about the centrally located hinge;
      each of the two long edges comprising a ledge having a connector therein, wherein the connector of each ledge is moveable about an axis coincident with a long edge and wherein each connector is movable by sliding; and
      a centrally located connector disposed in the central part back plate.

8. The system of claim 7, wherein the centrally located connector accepts the connector of the dock.

9. The system of claim 8, wherein the connector of each ledge is of the same type as the connector of the dock.

10. The system of claim 7, wherein the connector of each ledge comprises power pins and data pins.

11. The system of claim 7, said centrally located hinge permitting the at least one of the two long edges to rotate in fore and aft degrees of freedom.

12. The system of claim 8, said centrally located hinge permitting each of the two long edges rotate in fore and aft degrees of freedom about said centrally located hinge.

13. The system of claim 7, further comprising a stand, wherein the dock is integrated into the stand.

14. A system, comprising:
    two display panels;
    a dock including electronics and a connector to carry video signals between the dock and the two display panels; and
    a mount accessory, including:
       a back plate;
       a central part comprising a centrally located hinge;
       two long edges that are hingedly attached to the centrally located hinge and extend from the central part, wherein the centrally located hinge allows the two long edges to pivot with respect to each other and the back plate about the centrally located hinge;
       each of the two long edges comprising a ledge having a connector therein that connects to a respective one of the two display panels, wherein the connector of each ledge is moveable about an axis coincident with a long edge and wherein each connector is movable by sliding; and
       a centrally located connector disposed in a central location of the back plate that connects to the connector of the dock.

* * * * *